June 18, 1968  R. S. PHILLIPS  3,388,446
METHOD OF FORMING METAL SHEETS INTO SHAPES INVOLVING
COMPOUND CURVATURES, AND METAL SHEETS SO FORMED
Filed Nov. 8, 1965  3 Sheets-Sheet 3

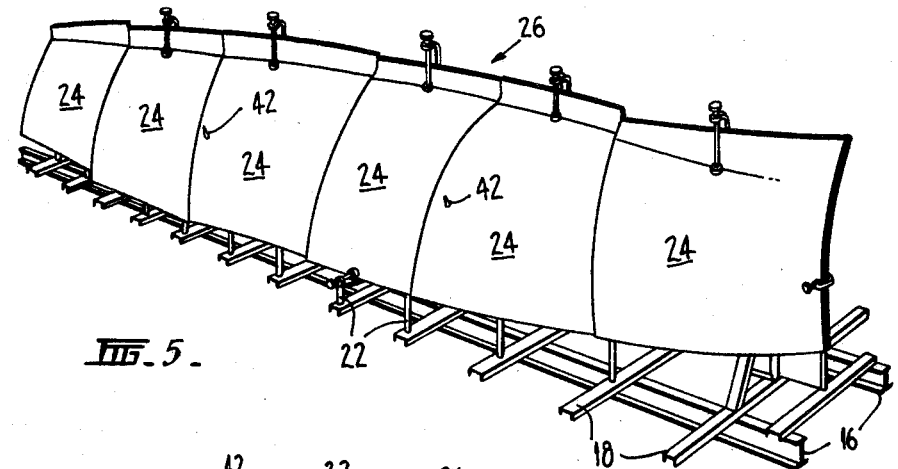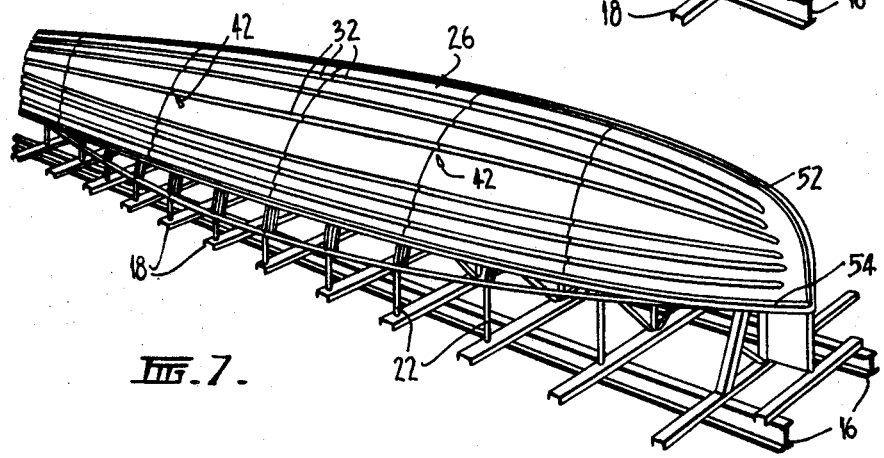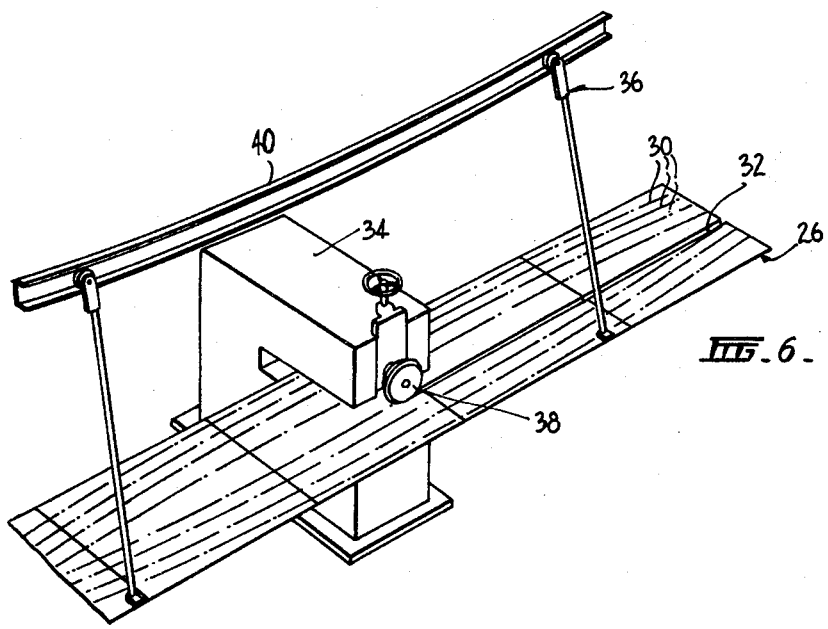

United States Patent Office 3,388,446
Patented June 18, 1968

3,388,446
METHOD OF FORMING METAL SHEETS INTO SHAPES INVOLVING COMPOUND CURVATURES, AND METAL SHEETS SO FORMED
Rex S. Phillips, West Ryde, New South Wales, Australia, assignor to Comalco Industries Pty. Limited, a corporation of Australia
Filed Nov. 8, 1965, Ser. No. 506,689
5 Claims. (Cl. 29—155)

ABSTRACT OF THE DISCLOSURE

For aid in forming sheet metal into shapes involving compound curvatures there is used a frame having the desired over-all shape of the article to be formed, and the metal sheet is cut to a size which, in at least one dimension, is larger than the corresponding dimension of the finished article. The frame is provided with marking elements of grooving lines at predetermined positions thereabout. The metal sheet is placed against the frame, and the grooving line elements are transferred from frame to sheet, whereafter the grooving lines on the sheet are completed by joining the elements thereof and longitudinal grooves are formed in the sheet along said grooving lines. The desired compound curvature is induced—so as to conform the sheet to the shape of the frame—by altering the width of at least one of said grooves over at least a part of its length.

---

This invention relates to a method for forming sheet metal plates, strips or the like into shapes which involve compound curvatures, i.e., surfaces curved in a plurality of planes and additionally to products of sheet metal formed according to this method.

Many applications will be found for the method and particular advantages will be found to accrue in those applications involving covering panels or sheets for bodies of irregular shape. Typical examples of such instances are the fuselage of some aircraft, the hull of marine vessels or some forms of rolling stock.

In the present construction of exterior panels the use of sheet metal of lightweight construction such as aluminium has many advantages from the view points of strength and pliability. However, due to the irregularity of the exterior shape throughout the length of the body these panels have been constructed of a multiplicity of sections of aluminium plate shaped appropriately in respect of their location in the panel and are all welded together to form the completed product. Considerable welding is required with resultant distortion and stressing of the metal.

A prime object of the invention is to provide a method of forming sheet metal into such irregular shapes, principally those involving compound curvatures, which substantially minimises the above noted defects.

It is a further object to provide a method of forming such sheet metal which relatively cheapens the production costs of articles produced.

In general terms the invention, therefore, is a method of forming sheet metal into shapes involving compound curvatures comprising cutting the sheet metal to a size which in at least one dimension, is greater than the corresponding dimension of the finished product, forming longitudinal grooves in the sheet metal, and altering the width of at least one of said grooves over at least part of its length to induce a compound curvature in the sheet to conform to a desired overall shape.

The invention furthermore provides a method of forming sheet metal into the shape of the hull of a marine vessel comprising the steps of providing a frame having the desired overall shape of the hull, preparing a sheet of metal of a size which, in at least the transverse dimension, is greater than the corresponding dimension of one side of the finished hull, forming longitudinal grooves in the sheet metal in predetermined space relationship, and altering the width of at least one of said grooves over at least part of its length to induce a compound curvature in the sheet to conform to the shape of the frame.

The invention also provides a sheet of metal and a hull for a marine vessel formed by the methods above defined.

A preferred form of the invention is illustrated in the accompanying drawings in which:

FIGURES 1 and 2 illustrate the general principle of the present invention, FIGURE 1 being a perspective view of a flat metal sheet formed with longitudinal grooves, while FIGURE 2 is a perspective view of the same sheet having a compound curvature induced by the method of the invention.

FIGURE 5 is a perspective view of the forming frame showing a series of flat metal plates, secured thereto and butt-welded together in the first step of forming the hull.

FIGURE 6 is a perspective view of the sheets shown in FIGURE 5 being grooved in a swaging machine after being marked out on the forming frame.

FIGURE 7 is a perspective view of the completed hull before removal from the frame.

Figure 1:
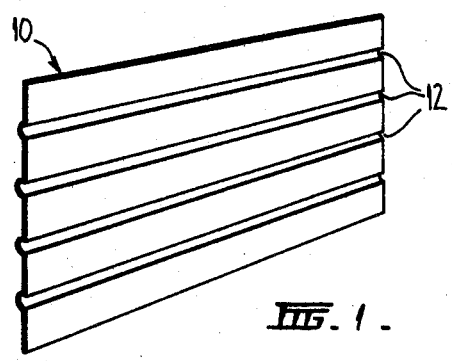
Figure 2:
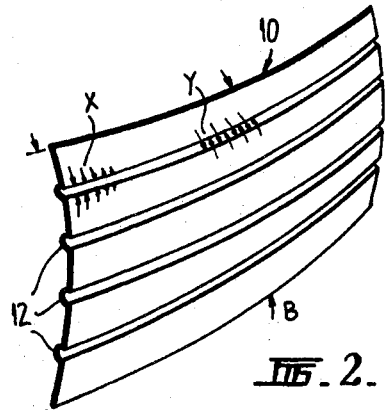

Referring now to FIGURE 1, there is illustrated a flat sheet of metal 10 which has been formed in a swaging machine or by other suitable means, with a series of longitudinal grooves 12 as a preliminary step in the method of the invention. The same sheet 10 as illustrated in FIGURE 2 has had the grooves 12 transversely compressed adjacent each of its ends as indicated by the arrows X, and has had its grooves 12 in the centre area of the length of the sheet opened somewhat as indicated by the arrows Y. The result of these operations is that the transverse dimension B of the sheet in its central area is greater than the transverse dimension A of the sheet at each of its ends, thus causing the sheet to adopt the shape illustrated in FIGURE 2.

The overall effect is similar to that achieved by stretching the metal in the central area of the sheet in that a compound curvature is induced in the sheet, but the operation itself is very much simpler and more controllable than stretching of the metal.

Accurate curvatures are readily achieved, and, in the event that too great a curvature is induced in the sheet, the process is readily reversed by closing the grooves in the areas where there have been opened to too great an extent, and/or reopening the grooves in those areas where they have been closed to too great an extent.

It will be appreciated that it is not essential that each groove have portions which are opened and others which are closed in relation to the initial width of the grooves it being equally possible to achieve the results of the invention by differential opening of the grooves at different points along their lengths or by differential closing of the grooves at different points along their lengths.

The basic principle of the invention has thus been described but in order that it may be more readily carried into effect by others it will now be further described in relation to its application to the construction of a particular article which in this case is the hull of a marine craft such as a yacht or a surfboat. Reference will be made to the use of sheet metal which is preferably aluminum, and it is to be understood that the gauge of this material may vary from relatively light gauges up to about quarter inch plate.

Figure 3:
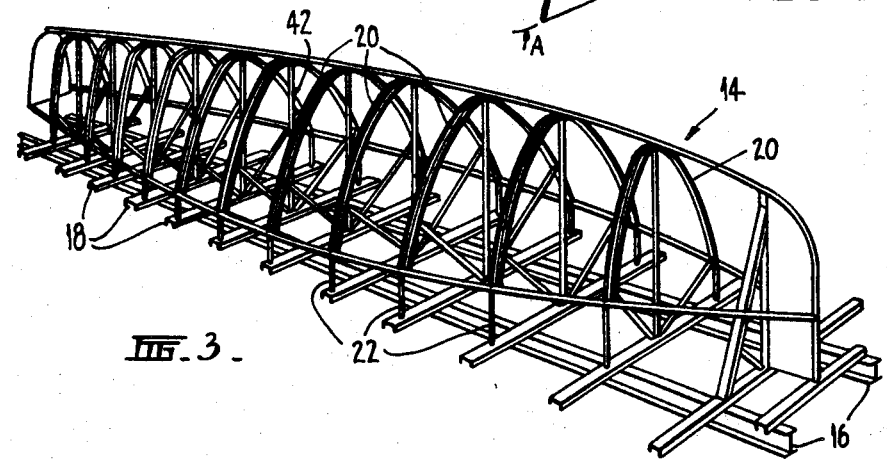
FIGURE 3 is a perspective view of a forming frame on which is to be constructed the hull of a yacht or surfboat by the application of the principles of the invention.
Figure 4:
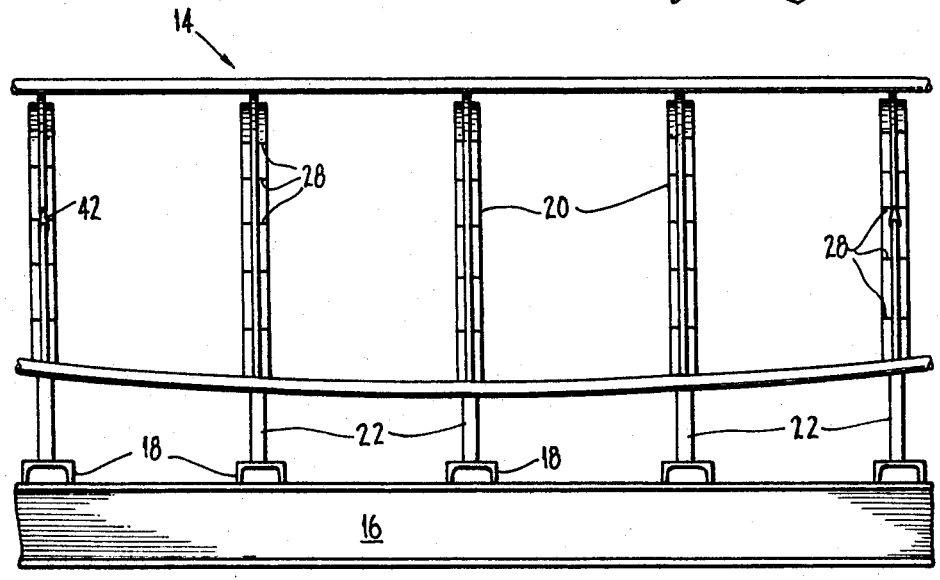
FIGURE 4 is a side elevational view on an enlarged scale of the central portion of the forming frame.

A suitable forming frame 14 illustrated in FIGURES 3 and 4 is first constructed using economical material such as steel T-section to a predetermined design. The outer extremities of the frame are intended to contact the hull only at spaced points along its length, and generally the structure is to be sufficiently strong to allow for compressive loads applied without distortion resulting. The effects of moderate amounts of hand hammer work and twisting are also to be withstood.

In its illustrated form the frame 14 comprises a pair of longitudinal beams 16 to which are affixed, preferably by welding, a plurality of transverse beams 18. Each of the transverse beams 18 supports a vertical rib 20 constructed mainly of T-section steel having its transverse flange on the inner side and its web projecting outwardly. Each of the ribs 20 is shaped in accordance with desired cross-section of the hull at that point and is supported on legs 22 to provide a clearance beneath the hull during the shaping operation. A predetermined number of plates or sections 24 (6 sections in the case of a 26 foot hull) are cut to a size such that their overall combined dimensions exceed the dimensions of one side of the hull to a predetermined extent. The ratio between the dimension of the combined hull section 26 composed of the plates 24 to the dimension of the finished hull is such that the hull section 26, will not be smaller than the required dimensions of the finished hull after the working operations to be hereinafter described have been carried out.

The next step in the method is to weld the sections 24 of shaped plates together, along their abutting edges to form the necessary unitary piece of material 26 for creating a half hull section, i.e., one side of a completed hull. When these welds have been completed some semblance of the desired hull shape is derived. Both sides of each weld should be dressed to give a smooth result and each weld treated in any other desired manner, such as by hammering or the like, in order to create a single plate 26 with a minimum of annealing and distortion at the butt welded joints. Nevertheless it will be realised that since the welds are all approximately parallel and since the plates are not rigidly anchored at this stage there is practically no welding stress induced in them. This is in sharp contrast to the very high welding stresses induced in the form of construction where a surface of compound curvature is achieved by cutting a relatively large number of relatively small plates and welding them together along their edges.

As one of the final steps in the construction of the frame 14, the ribs 20 have been provided with markings such as those indicated at 28 in FIGURE 4 at precalculated positions. These markings are now transferred to the inside of the composite sheet 26 and are then marked out in corresponding positions on the outside of the composite sheet 26. The lines of points are then joined to make continuous swaging or grooving lines 30 such as those illustrated in FIGURE 6. There will usually be some inaccuracy in the marking out of the points and since a smooth curve is to be preferred to an erratic line, both from the point of view of ease of working and the appearance of the finished product, the preferred method of marking out the swaging lines is to take a long flexible piece of timber and bend it in a smooth curve to match as nearly as possible the points marked out along the composite sheet 26. The piece of flexible timber is then used as a ruler for marking out the swaging lines.

For best results the swaging lines 30 should follow the style lines of the hull design.

The composite sheet 26 is then removed from the frame 14 and passed through a swaging machine as illustrated in FIGURE 6 to form a groove along each swaging line 30. The grooves 32 will be concave as viewed from the outside of the hull.

The swaging machine 34 has incorporated with it a suitably designed swinging rig 36 to allow for the free and straight entry of the composite plate 26 towards the jaw 38 of the machine, and to allow it to continue freely through the machine whilst the groove is being formed, thus allowing for a high degree of accuracy in following the individual swaging lines 30 and maintaining a satisfactory contour in the form of the grooves.

Finger tip control of the swaging machine 34 is necessary to achieve accuracy of metal working, particularly at the points where welding or other work has taken place. A type of monorail 40 for larger type sheets will be necessary and this possibly can be curved and shaped to follow the general style of waterlines so that the contour of the composite sheet 26 is followed by the monorail 40 above to enable satisfactory presentation to the jaws 38 of the machine. Some experimentation of sample sections may be necessary in order to ascertain the extent to which the material needs to be worked to obtain the desired depth as well as width of the grooves 32. Where relatively deep grooves are to be formed each may be shaped gradually in several passes through the swaging machine 34 rather than in a single pass.

At this stage the composite sheet consists of a number of flat grooved sheets welded to each other with distinct angles between adjacent sheets at the weld lines rather than a smooth flowing curve. Initial working is therefore carried out in order to generate a relatively smooth curve. This consists of contracting the grooves 32 adjacent the welds, leaving the grooves at the midpoints between the welds in their as-rolled condition. This working may consist of a maximum contraction of the grooves at the weld lines with gradually decreasing contraction towards the centres of the sheets.

Alternatively, the preliminary working may consist of expansion of the grooves at the midpoints of the sheets with diminishing expansion on each side of the midpoints down to zero adjacent the welds. As a further alternative the grooves may be contracted adjacent the welds and expanded at the midpoints of the sheets with gradual transition from contraction to expansion along the grooves from the various weld lines to the various midpoints of the sheets.

Figure 9:
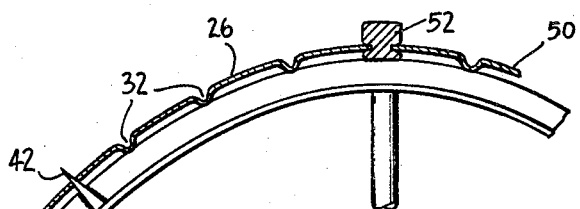
FIGURE 9 is a partial cross-sectional view of the hull after forming has been completed.
Figure 10:
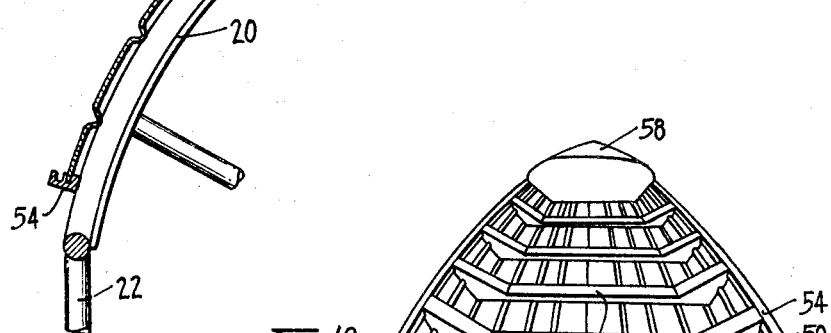
FIGURE 10 is a perspective view of the forward end of the completed hull shown in transverse section at approximately the mid-ships position.
Figure 11:
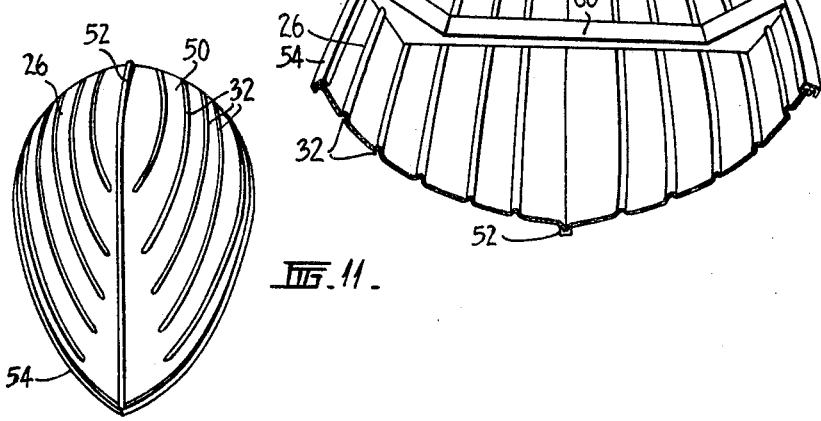
FIGURE 11 is a perspective view of the forward end of the hull in an inverted position.

After this preliminary shaping the composite sheet 26 is returned to the frame 14 and is relocated in its initial position by means of a pair of spaced spigots 42, which are best illustrated in FIGURES 6 and 9.

Figure 8:
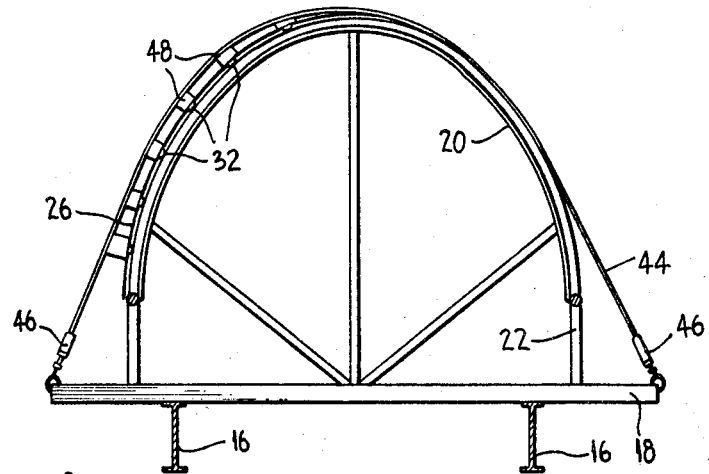
FIGURE 8 is a cross-sectional view of portion of the frame during one step in the construction of the hull.

The sheet 26 is clamped to the frame by means of a plurality of straps 44 as illustrated in FIGURE 8. Each strap 44 is anchored to a cross beam 18 and is provided with a pair of turnbuckles 46. Blocks of wood or other suitable material 48 are placed beneath the straps to force the sheet against the ribs 20 of the frame 14. With the aid of predetermined markings on the frame the desired final shape of the sheet is then marked out and the sheet is removed from the frame and trimmed to its final shape.

The clamping referred to has the effect of resiliently expanding and/or contracting the grooves to enable the plate 26 to sit against the frame 14, but this distortion is merely temporary and upon release of the straps the sheet will spring back to substantially the shape it had before being replaced on the frame.

In other embodiments of the invention, the straps 44 may be replaced by an external frame, surrounding frame 14 and provided with jacks adapted to bear against the composite sheet 26 to clamp it firmly against the frame.

The composite sheet 26 is removed from the frame which is then used to construct a further composite sheet 50 in similar manner for the other side of the hull. When the two sides of the hull are ready, a keel extrusion 52 and two gunwale extrusions 54 are welded to the frame in the appropriate positions. The composite sheets 26 and 50 are returned to the frame and reclamped by means of the straps 44 so that their edges are in engagement with the keel and gunwale extrusions. The composite sheets are welded to these extrusions and then the straps are removed. It will then be found that the bottoms of many of the grooves will lift free of many or all of the ribs of the frame.

Further work must then be carried out to give the hull its final shape.

The ideal to be aimed at in this operation is to expand and/or contract the grooves in such a way as to enable each groove to lightly touch against each rib of the frame or to have a very small clearance from each rib while at the same time preserving a smooth overall contour.

To achieve this result a reasonably high degree of care and skill will be required of the operatives but as a general rule, it can be said that where all the grooves except one are touching against a particular rib of the frame, the one groove can be brought down to the rib by crimping it adjacent the particular rib with gradual tapering of the crimping to each side of the rib.

Alternatively if only one groove is touching against a particular rib that one groove should be expanded slightly to raise it clear of the rib before contraction of the other grooves is commenced to bring them down to the rib. If this is not done it will be found that crimping of the other grooves will result in a high contact pressure between the one groove and the rib so that when the boat is removed from the frame this groove will spring inwardly and form a hollow in the external surface of the hull.

The forming of the hull is completed when a smooth overall shape has been achieved with the bottoms of the grooves in the composite plates 26 and 50 just touching or almost touching each of the ribs 20 and with substantially no tension across the width of the sheets between the keel and gunwale extrusions.

It has been found in practice that it is easier to contract the grooves 32 than to expand them and for this reason it is preferred to trim the plates in the final shaping step so that their width is somewhat greater than will finally be required. This enables the fitting of the hull to the frame 14 to be carried out entirely by differential crimping rather than by partial crimping and partial expansion of the grooves. The hull is now ready to receive internal framing.

Ready prepared bulkhead sections 58 are fitted and tack-welded into each end and crossbracing members 60 are fitted and tack welded at intervals throughout the length of the hull. The hull is then removed from the frame and any additional welding is carried out. Finally the hull is provided with a deck by laying suitable members such as planking on top of cross-members 60.

As a result of the above described method it will be appreciated that a hull is produced which comprises a small number of welded sections with each section having a shape involving compound curvature. In some instances a complete hull might be formed of a single section, thereby eliminating entirely the need for weld joints between sections with consequential elimination of distortion in the material.

The inclusion of the swaging step in the foregoing method in effect serves a dual purpose, firstly in that the grooves 32 effectively store in a relaxed condition some of the metal which in the working of the sheet or plate in the formation of the hull, by either crimping or opening the grooves, permits the actual dimensions defined by the edges of the sheet to be varied at the will of the craftsman.

As formed the grooves are of uniform width throughout their lengths and any groove which finally is of varying width throughout its length will contribute to the formation of a compound curvature.

The second purpose of the grooves is that they reinforce and strengthen the hull thus enabling it to be made of lighter metal than would otherwise be the case.

As modifications within the spirit and scope of the invention may readily be effected by persons skilled in the art, it is to be understood that this application is not limited to the details of the method and product described by way of example hereinabove, but is limited only by the appended claims.

I claim:

1. A method of forming sheet metal into shapes involving compound curvatures comprising the steps of providing a frame having the desired overall shape of the sheet metal, cutting the sheet metal to a size which, in at least one dimension, is greater than the corresponding dimension of the finished product, marking elements of grooving lines at predetermined positions on said frame, placing said sheet metal against said frame, transferring said elements of grooving lines to said sheet metal, completing said grooving lines on the sheet metal by joining the elements thereof, forming longitudinal grooves in the sheet metal along said grooving lines, and altering the width of at least one of said grooves over at least part of its length to induce a compound curvature in the sheet to conform to the shape of the frame.

2. A method of forming sheet metal into shapes involving compound curvatures comprising the steps of providing a frame having the desired overall shape of the sheet metal, marking elements of grooving lines at predetermined positions on said frame, joining together a plurality of flat sheets of metal to provide a composite sheet which in at least one dimension is greater than the corresponding dimension of the finished product, placing said composite sheet against said frame, transferring said elements of grooving lines to said sheet metal, completing said grooving lines on the sheet metal by joining the elements thereof, forming longitudinal grooves in the sheet metal along said grooving lines, and altering the width of at least one of said grooves over at least part of its length to induce a compound curvature in the sheet to conform to the shape of the frame.

3. A method of forming sheet metal into shapes involving compound curvatures as claimed in claim 1, including the step of trimming said sheet metal after the grooves have been formed in it and before or after it has been caused to conform to the shape of the frame.

4. A method of forming sheet metal into the shape of the hull of a marine vessel comprising the steps of providing a frame having the desired overall shape of the hull, preparing a sheet of metal of a size which, in at least the transverse dimension is greater than the corresponding dimension of one side of the finished hull, forming longitudinal grooves in the sheet metal in predetermined spaced relationship, trimming the sheet metal to the required final dimensions, for one side of the hull, preparing a second sheet of metal of a size which, in at least the transverse dimension, is greater than the corresponding dimension of the other side of the finished hull, forming longitudinal grooves in the sheet metal in predetermined spaced relationship, trimming the sheet of metal to the required final dimensions for the other side of the hull, welding a keel section and two gunwale sections to the frame in appropriate positions, placing each sheet of metal in appropriate engagement with the keel section and one of the gunwale sections and welding it to said sections, and altering the width of at least one of said grooves in each of said sheets over at least part of its length to induce a compound curvature in each sheet to conform to the shape of the frame.

5. A method of forming sheet metal into shapes involving compound curvatures comprising cutting the sheet metal to a size which, in at least one dimension, is greater than the corresponding dimension of the finished product, forming longitudinal grooves in the sheet metal, placing the sheet metal on a form representing the desired overall shape of the sheet metal, and altering the width of at least one of said grooves over at least part of its length to induce a compound curvature in the sheet to confirm to said desired overall shape, which method further includes the step of trimming said metal sheet after said grooves have been formed in it and before or after it has been caused to conform to said desired overall shape.

References Cited

UNITED STATES PATENTS

| | | | |
|---|---|---|---|
| 1,847,310 | 3/1932 | Schmitz | 29—471.1 |
| 2,444,463 | 7/1948 | Nordquist | 113—120 |
| 2,619,045 | 11/1952 | Dean | 29—448 |
| 2,636,968 | 4/1953 | Watter | 113—120 |
| 2,684,489 | 7/1954 | Porter | 9—6 |
| 2,685,263 | 8/1954 | Barnes et al. | 29—448 X |
| 3,238,610 | 3/1966 | Berg | 29—421 |

THOMAS H. EAGER, *Primary Examiner.*